Figure 1:
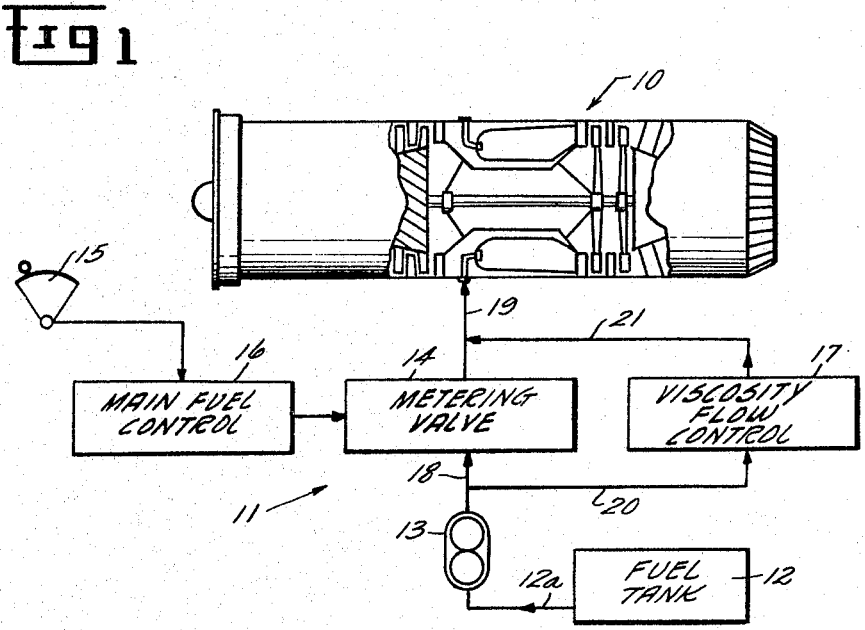

Nov. 1, 1966

H. KATZ ET AL 3,282,323

VISCOSITY RESPONSIVE DEVICES

Filed April 14, 1965

2 Sheets-Sheet 1

INVENTORS.
HERBERT KATZ
ARNOLD M. HEITMANN
THEODORE P. TIMBIE

BY

ATTORNEY

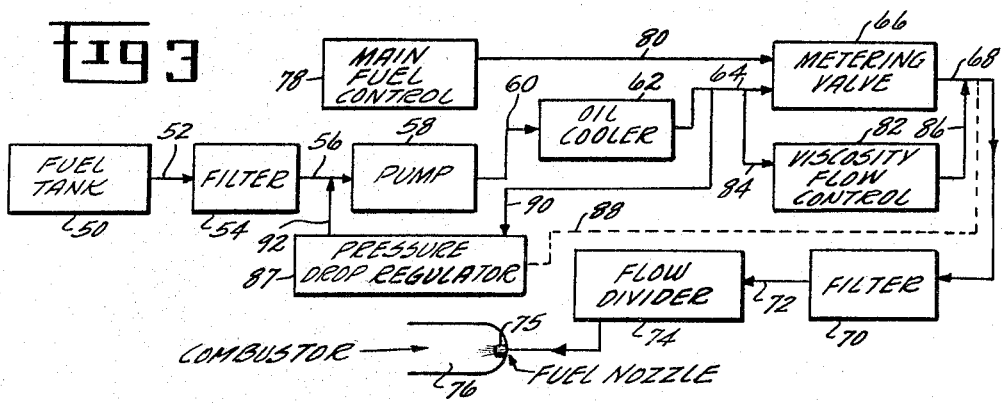
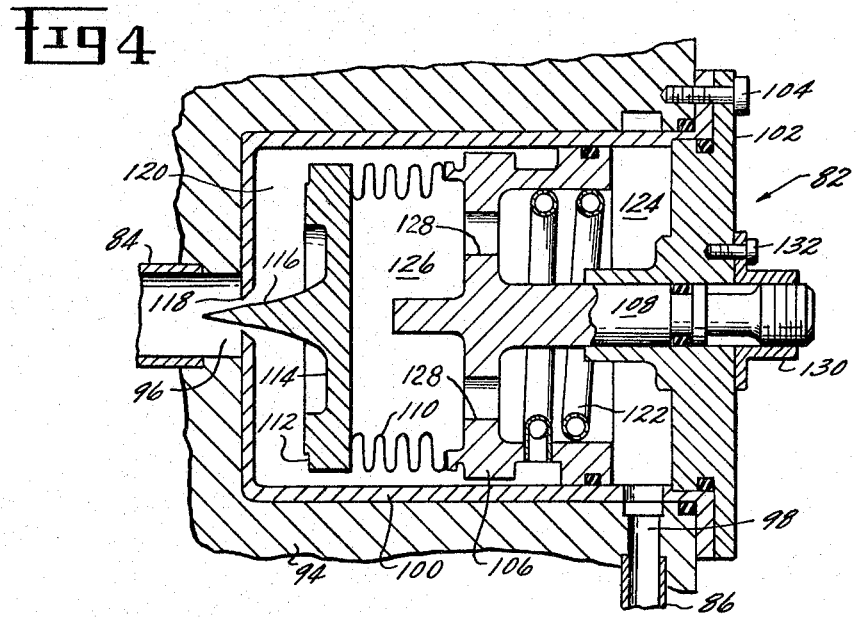
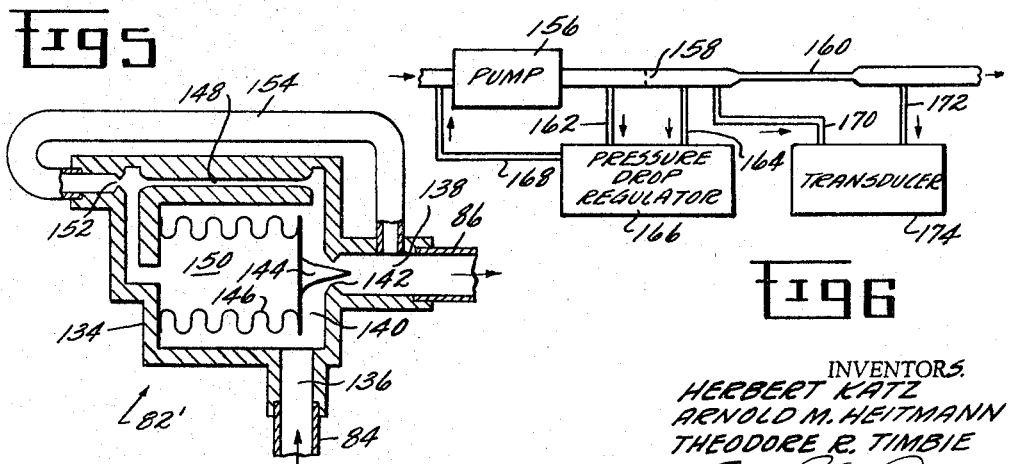
INVENTORS.
HERBERT KATZ
ARNOLD M. HEITMANN
THEODORE R. TIMBIE
By
ATTORNEY

United States Patent Office 3,282,323
Patented Nov. 1, 1966

3,282,323
VISCOSITY RESPONSIVE DEVICES
Herbert Katz, Peabody, Arnold Mandius Heitmann, Swampscott, and Theodore Ruggles Timbie, Marblehead, Mass., assignors to General Electric Company, a corporation of New York
Filed Apr. 14, 1965, Ser. No. 448,030
16 Claims. (Cl. 158—36)

The present invention relates to improvements in viscosity responsive devices and finds unique application in both controlling systems and instruments for measuring viscosity. This application is a continuation-in-part of our copending applications Serial No. 325,046, filed November 20, 1963, now abandoned, and Serial No. 396,452, filed August 13, 1964, the latter being a divisional application of the former.

In flow controls, it is sometimes advantageous to control the fluid flow as a function of fluid viscosity. This is particularly true in combustion engines and in gas turbine engines where various characteristics of the engines and fuels have been utilized to determine the quantity of fuel introduced into the combustion chamber. For instance, some fuel control systems have been employed which measure the temperature of the fuel to provide a more optimum fuel input to the engine, since it was realized that temperature was a factor in determining the degree that fuel would atomize, and this in turn directly affected the combustion efficiency.

However, as will be explained hereinafter, an improved means for controlling fuel input is to measure the fuel viscosity and regulate fuel flow proportionate to this measurement since viscosity is a direct indication of the atomizing capability of the fuel. For instance, during starting operation of a gas turbine, if ignition of the fuel does not occur immediately, the fuel may pool within the combustion chamber, and when ignition does occur, overtemperaturing of the gas turbine may result because of the immediate combustion of the excess fuel collected within the chamber. Such an overtemperaturing condition is commonly referred to as a hot start. It is, therefore, especially important during start up and at other selected times to provide optimum combustion conditions so that ignition will occur immediately to prevent such hot starts. Since the combustion efficiency and the likelihood of fuel ignition is directly affected by the quantity of atomized fuel within the combustion chamber, and since the atomization capabilities of the fuel are directly related to the fuel viscosity, it has been found that by regulating fuel flow as a direct function of viscosity, efficient ignition conditions and combustion may be achieved and maintained.

It is accordingly one object of this invention to provide a flow control device which regulates fluid flow responsive to fluid viscosity.

It is another object of this invention to provide a fuel control system for regulating fuel flow to combustion engines as a function of fuel viscosity.

It is another object of this invention to provide a fuel control system for regulating fuel flow to a combustion engine during start or idle operation as a function of viscosity.

It is another object of this invention to provide a viscosity responsive device which enables quick and accurate measurements of the viscosity of a liquid, particularly what may be referred to as its dynamic viscosity when it is flowing through a conduit system.

Figure 2:
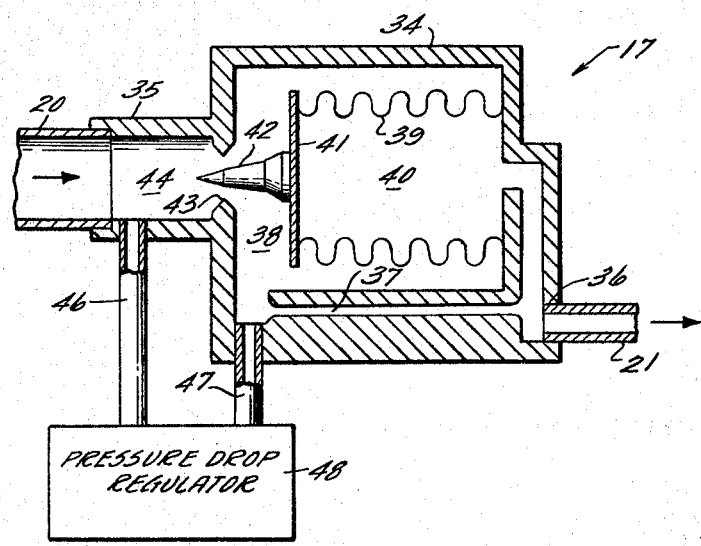

Other objects and many of the attendant advantages of this invention will be readily appreciated as the same becomes better understood by reference to the following detailed description when considered in connection with the acompanying drawings wherein:

FIG. 1 is an abbreviated schematic and block diagram showing the general arrangement of a turbojet and the fuel control, FIG. 2 is a schematic of a viscosity flow control valve embodying this invention, FIG. 3 is a schematic and block diagram showing more fully the control components for supplying fuel to an engine combustor, FIG. 4 is a longitudinal section of the viscosity flow control device referred to in FIG. 3, FIG. 5 is a longitudinal section illustrating a modified viscosity flow control device, and FIG. 6 is a block diagram illustrating the use of the present invention for obtaining viscosity measurements per se.

Referring now to the drawings and more particularly to FIG. 1, a block diagram of a fuel control system is illustrated, being of a type for use with a gas turbine engine, and employing the present viscosity flow control. While this particular fuel control for a gas turbine engine is illustrated as one application of the subject invention, it should be remembered that the invention may be applied to other flow control systems with beneficial results. Specifically, gas turbine engine 10 is illustrated as having a fuel system 11 comprising a fuel tank 12, providing fuel through a fuel line, illustrated by the line 12a, through a pressurizing pump 13, conduit 18, metering valve 14, and conduit 19, to the engine 10. A throttle 15 connected to a main fuel control 16 provides a signal to the main metering valve 14 to regulate the supply of fuel to the gas turbine engine 10.

Connected in parallel fluid flow relationship with the metering valve 14 is a viscosity flow control 17. The control system utilizes the viscosity flow control 17 to regulate fuel flow to the gas turbine engine primarily during starting. Under starting conditions it is important that sufficient fuel be supplied to the engine to obtain proper or sufficient atomization to support and maintain combustion as explained heretofore. Also, while this situation is more common during starting, during idle, and other operating speeds, fuel in sufficient quantities and properly atomized state must be supplied to the engine or combustion may not be maintained.

The viscosity flow control 17 senses the viscosity of the fuel and thereby determines a primary fuel property which is a direct function of the atomizing capability of the fuel. The atomizing capability of the fuel is its ability to be reduced to small particles in the form of a spray when forced under pressure through the fuel nozzle for introduction into the combustion chamber. Under all normal operating conditions some of the fuel will atomize. However, it has been found that the percentage of fuel which atomizes properly, normally decreases as the viscosity increases. By regulating the fuel flow to the engine as a function of viscosity it is thereby assured that sufficient fuel is supplied such that an amount of atomized fuel will be introduced into the combustor which will support and maintain combustion.

Viscosity flow controls, as herein disclosed, may be employed in several different ways to assure delivery of the proper amount of fuel for combustion as a function of the fuel viscosity. Such controls may be used either to provide the entire supply of fuel necessary for light-off, or may be used as a supplement to a minimum amount of fuel provided by the main metering valve.

In the present instance the system in FIG. 1 is based on the viscosity flow control 17 providing the full amount of fuel required for light-off and appropriate valve means (not shown) are provided for preventing flow of fuel through the metering valve 14 when the engine is first started. The viscosity flow control 17, as previously indicated, is connected in parallel with the metering valve 14, and fuel flows thereto through conduit 20. The fuel passed by the viscosity flow control is fed to the engine 10 through the conduit 19 and 21.

The viscosity flow control 17 is better understood from the diagrammatical illustration found in FIG. 2. This control comprises a housing 34 having a fluid flow inlet 35 which is connected ot the conduit 20, and a fluid flow outlet 36 connected to the conduit 21. Fuel flows from the inlet 35 to outlet 36 through a laminar flow passageway 37, the entrance to which is located in a cavity or chamber 38. A bellows 39 is mounted within the casing 34 and its exterior is subjected to the pressure of chamber 38, this being the fluid pressure of the fuel prior to passage through the laminar flow passage 37. The interior of the bellows 39, indicated as chamber 40, is connected to the discharge end of the laminar flow passage 37 and is thus maintained at that pressure.

The bellows end plate 41 is therefore positioned as a function of the pressure drop through the laminar flow passage 37, the surface area of the bellows, and its spring rate. The bellows end plate 41 supports and positions a flow restrictor 42 in a position dependent upon the pressure drop to the laminar flow passageway which in turn is a direct function of fuel viscosity, since surface area and spring rate of the bellows are predeterminable constants. The restrictor 42 interacts with an orifice 43 at the inlet 35 to form a flow restrictor valve 44 to thereby provide means for regulating flow of fuel through the flow control 17.

To further explain the proposition that the pressure drop through the laminar flow passage 37 is a direct function of viscosity, it would first be pointed out that the passageway 37 is so dimensioned with respect to expected rates of fuel flow therethrough that a Reynolds number is obtained which will predictably yield laminar flow of the fuel. Under such laminar flow conditions the pressure drop in a flow passageway may be calculated, by known formula, as:

$$\Delta P = \frac{QluC}{d^4}$$

where:

$\Delta P$=the pressure drop through the flow passage
$Q$=the total fluid flow
$l$=the length of the passage
$u$=the viscosity of the fluid
$d$=the diameter of the passage
$C$=a proportionality constant therefore, $$\Delta P = K \cdot Qu$$

Since K may equal a constant representing the dimensions of the flow passage and such dimensions are maintained constant, the pressure drop through the passageway is directly proportional to the viscosity of the fluid, in the present case the fuel, and the volume flow.

The orifice 43 is preferably a thin plate type, whereby flow of fuel therethrough is relatively independent of viscosity and a direct function of area. The contour of the flow restrictor 42 is generated so that the area of the orifice 43 is varied as the bellows 39 expands and contracts. The amount of fuel delivered to the engine 10 thus becomes a direct function of viscosity derived from the amount of fuel flow as predetermined by the contour of the restrictor 42, thereby insuring the proper amount of fuel for optimum vaporization in the combustor chamber for light-off and other conditions as may be desired.

In order that the contour of the flow restrictor 42 may be more readily and accurately calculated or otherwise determined, it is preferable that a constant pressure drop be maintained across the thin plate orifice 43. To this end a bypass conduit 46 is connected on one side thereof and a pressure sensing conduit 47 is connected at the opposite side thereof. The conduits 46 and 47 are in turn connected to a pressure drop regulator 48 of a known type which may be utilized to maintain the pressure drop across the orifice 43 constant by controlling the bypass flow of fuel through the conduit 46. It will be noted that the profile or contour of the flow restrictor 42 shown in FIG. 2 is clearly exemplary.

Reference is next made to FIG. 3 for a description of a modified embodiment of the invention. In this figure the fuel control elements are more completely illustrated and comprise a fuel tank 50 from which fuel is drawn through conduit 52, through a filter 54, and through conduit 56, to a pump 58. Pressurized fuel is discharged from the pump 58 to a conduit 60, through an oil cooler 62, and then in normal operation through a conduit 64, to a metering valve 66 which schedules the delivery of fuel as required for proper operation of the gas turbine engine which is herein illustrated diagrammatically by a combustor 76. To complete the description of fuel flow, from the metering valve 66, the fuel flows through conduit 68, filter 70, conduit 72, and then to a flow divider 74 which distributes the fuel to a plurality of fuel nozzles 75. Operation of the metering valve 66 is controlled by a main fuel control 78, which has an input connection 80 to the metering valve. A more complete description of such a basic control is included in U.S. Patent No. 2,931,168, entitled "Variable Stator Engine Control System," Alexander et al., issued April 5, 1960, and assigned to the same assignee. Reference may be made thereto if further details of such a control are desired.

A viscosity flow control 82 is connected in parallel with the metering valve 66 by conduits 84 and 86 which provide an alternate flow path for the fuel which is utilized primarily at light-off of the gas turbine engine. In order that the metering valve 66 will more accurately deliver a desired amount of fuel it is preferable to maintain a constant pressure drop thereacross. To this end a pressure drop regulator 87 is provided with a pressure sensing line 88 being connected thereto from conduit 68 and a bypass conduit 90 connected thereto from conduit 64. Fluid bypassed through the pressure drop regulator is returned to the suction side of the pump 58 through conduit 92. It will thus be apparent that with the described arrangement the pressure drop regulator 87 also maintains a constant pressure drop across the viscosity flow control 82.

Referring now to FIG. 4 the viscosity flow control 82 comprises a housing 94 having an inlet 96 to which the conduit 84 is connected and an outlet 98 to which the conduit 86 is connected. A cuplike shell 100 is held in place on the housing 94 by an end cap 102 and screws 104. A base member 106 is telescoped within the shell 100 and has a stem 108 which extends through the end cap 102, with appropriate sealing means being provided to prevent leakage therebetween. One end of a bellows 110 is secured to the base member 106. The opposite end of the bellows 110 is secured to a ring 112 from which projects a restrictor 116. The restrictor enters a thin plate orifice 118 formed in the bottom wall of the shell 100. The orifice 118 provides for flow of fuel from the inlet 96 to the interior of the shell 100, the interior of which defines a chamber 120. From the chamber 120 fuel flows through an opening in the base 106 into a spiral tube 122 and is discharged on the interior of the base into a chamber 124 defined in part by the interior of the base 106 and the end cap 102. The interior of the bellows 110 indicated as chamber 126 communicates with the chamber 124 through holes 128 and consequently is at the same pressure. Fuel is discharged from the chamber 124 through the outlet 98 for flow in the fuel control system as previously described.

It will be apparent that the pressures in chambers 120 and 126 and the area and spring rate of bellows 110 determine the extent to which the bellows is compressed or expanded and in turn control the degree to which the restrictor 116 projects into the thin plate orifice 118. Operation of the present flow control is therefore quite similar to that of the embodiment of FIG. 2 in that there is a pressure drop as the fuel flows through the spiral tube 122, which pressure drop is a function of viscosity and a control parameter which can directly regulate the amount of fuel flowing through the flow control device.

There are two differences to be noted in the flow control 82. First is the use of the spiral tube 122 as a laminar flow passageway to produce the pressure differential which is actually the controlling force regulating fuel flow as a function of viscosity. The use of the spiral laminar flow path is preferred because a much higher Reynolds number for the flow conditions may be used and still obtain a laminar flow condition. This means that a greater pressure drop can be achieved with a minimum space requirement to thereby obtain greater accuracy of control with a device which is compact.

It will also be appreciated that the pressure drop across the thin plate orifice 118 is not constant. Thus fuel flow through this orifice is a factor of both area and pressure drop and yet relatively insensitive to viscosity changes. This factor increases the parameters which must be considered in determining the contour of the restrictor 116 (the illustrated configuration is again exemplary), but not to any great degree, inasmuch as there is a known pressure drop between the inlet 96 and the outlet 98. It is thus preferred that a constant pressure drop be maintained either across the thin plate orifice or across the series connected thin plate orifice and laminar flow path for ease of computing the configuration of the restrictor to insure accurate passage of predetermined quantities of fuel for any given viscosity within a normal working range.

It will also be seen that the base member 106 may be adjusted to position the restrictor 116 axially relatively to the orifice 118 in order to initially position the restrictor in a proper position. To this end a nut 130 is threaded onto the end of the shaft 108 and then secured in fixed relation to the cap 102 by a screw 132. Appropriate means are provided for sealing the sliding connection between the base 106 and the shell 100 so that the pressure in chamber 120 and the chambers 124, 126 represent the pressure differential created by flow of fuel through the laminar flow passage, namely the spiral tube 122.

The restrictor 116 never fully closes the orifice 118. Therefore, under normal operating conditions the viscosity flow control 82 can also serve as a minimum fuel flow device, since, under such normal operating conditions the viscosity of the fuel is stable and the flow constant.

It will further be noted in connection with FIG. 3 that the fuel first passes through the oil cooler 62 before flowing to the viscosity flow control 82. This is of significance in assuring that the viscosity flow control is responsive to the viscosity condition of the fuel essentially as it will be delivered to the nozzles 75. In operation the viscosity flow control is physically located relative to the fuel nozzles at a point where there will be little or no viscosity change in the fuel flowing therebetween. If the engine were restarted after being in operation for a while, the viscosity of the fuel delivered by the pump 58 could be substantially reduced as it absorbs heat in passing through the oil cooler. If viscosity were measured before passing through the oil cooler, it would be substantially different from the viscosity at the time of atomization. However, such a viscosity differential will not exist between the fuel flowing through the viscosity flow control and the fuel being delivered to the nozzle 75 employing the system of FIG. 3.

FIG. 5 illustrates another embodiment of a flow control valve which may be incorporated in the fuel control system illustrated in FIG. 3. The fuel control 82' comprises a housing 134 having an inlet 136 and an outlet 138 connected respectively to the conduits 84 and 86. Fuel flows into a chamber 140 within the housing 134 and then through a thin plate orifice 142 to the outlet 138. A restrictor 144 is connected to a bellows 146 and varyingly controls the area of the orifice 142 as a function of viscosity to control the amount of fuel flowing therethrough.

Again this control function is provided by a pressure drop through a laminar flow passage 148, the outlet of which communicates with the chamber 150 defined by the interior of the bellows 146. The pressure differential between chambers 140 and 150 thus represents the pressure drop along the laminar flow passage 148 and is a direct function of viscosity, positioning the restrictor 144 to provide a controlled flow of fluid through the orifice 142. In the present instance the fuel flowing through the laminar flow passageway 148 then flows through a sharp edged orifice 152 of fixed area. A conduit 154 returns the fuel employed in obtaining a viscosity parameter back to the outlet 138.

It will be remembered that a constant pressure differential exists between the conduits 84 and 86 by reason of the provision of the pressure drop regulator 87 shown in FIG. 3. By having this constant pressure drop it is possible to predetermine the pressure drop along the laminar flow passageway 148 and also the pressure drop across the sharp edged orifice 152 through the use of known formulae to predetermine the necessary profile or contour of the restrictor 144 which will pass the desired amount of fuel for a given viscosity condition.

Reference is next made to FIG. 6 which diagrammatically illustrates another aspect of the invention wherein direct viscosity measurements are made in a conduit system. The fluid is pressurized by a pump 156 and then passes through a thin plate orifice 158 and then through a laminar flow passageway 160 and continues therefrom for whatever use is required.

Conduits 162 and 164 are connected to a pressure drop regulator 166 to maintain a constant pressure drop across the orifice 158. Conduit 168 returns bypassed fluid from the pressure drop regulator 166 back to the suction side of the pump 156. The described arrangement provides a constant rate of fluid flow through the laminar flow passage 160 by reason of the constant pressure drop and the use of a thin plate orifice which is insensitive to viscosity changes. As the liquid flows through the laminar passage 160 a pressure drop is developed thereacross which is a direct function of viscosity. Conduits 170, 172 are connected to the inlet and outlet ends of the laminar flow passage 160 and to a pressure transducer 174 which will convert the pressures from conduits 170, 172 into an analog indication, as for example a meter which may be readily observed in an instrumentation board.

The present disclosure illustrated the preferred embodiment of the present invention as they are now best known. However, it is to be understood that this disclosure is not limiting and the scope of the invention is to be derived from the following claims.

Having thus described the invention, what is claimed as novel and desired to be secured by Letters Patent is:
1. For use in combination with a gas turbine engine,
   means for delivering fuel to said engine,
   means for controlling delivery of fuel thereto and including,
   a main fuel control,
   a viscosity flow control providing a path parallel to said main fuel control for delivery of fuel to said engine,
   said viscosity fuel control including means directly responsive to viscosity of the fuel for modulating the amount of fuel delivered during ignition of said engine in a predetermined relation to the viscosity of the fuel and in increasing amounts with increasing viscosity.
2. For use in combination with a gas turbine engine,
   means for delivering fuel to said engine, means for controlling delivery of fuel thereto,
an oil cooler upstream of said controlling means, said oil cooler being capable of heating the fuel and changing its viscosity, and
a viscosity flow control downstream of said oil cooler and providing a parallel path for delivery of fuel to said engine, said viscosity fuel control including means directly responsive to viscosity of the fuel for modulating the amount of fuel delivered as a predetermined function of its viscosity.

3. For use in combination with a gas turbine engine,
means for delivering fuel to said engine,
means for controlling delivery of fuel thereto and including,
a main fuel control, and
a viscosity flow control providing a path parallel to said main fuel control for delivery of fuel to said engine,
said viscosity flow control including,
a laminar flow passageway,
and valve means responsive to the pressure drop across said laminar flow passageway for increasing the amount of fuel delivered through said viscosity flow control in predetermined relation as a function of increasing viscosity of the fuel.

4. For use in combination with a gas turbine engine,
means for delivering fuel to said engine,
means for controlling delivery of fuel thereto and including,
a main fuel control,
a viscosity flow control providing a path parallel to said main fuel control for delivery of fuel to said engine, and
means for maintaining a constant pressure drop across said main fuel control and also across said viscosity flow control,
said viscosity flow control including,
a laminar flow passageway,
a thin plate orifice,
a restrictor projectable in said orifice to vary the area thereof, and
means responsive to the pressure drop across said laminar flow passageway for controlling the extent to which said restrictor projects into said orifice and thereby increasing the amount of fuel passing therethrough in increasing amounts in predetermined relation as a function of increasing viscosity of the fuel.

5. For use in combination with a gas turbine engine,
means for delivering fuel to said engine,
means for controlling delivery of fuel thereto and including,
a main fuel control,
a viscosity flow control providing a path parallel to said main fuel control for delivery of fuel to said engine,
an oil cooler upstream of said main fuel control and said viscosity flow control, and
means for maintaining a constant pressure drop across said main fuel control and also across said viscosity flow control,
said viscosity flow control including a laminar flow passageway, the outlet of which is at the outlet of said viscosity flow control,
a thin plate orifice upstream of said laminar flow passageway at the inlet to said viscosity flow control,
a housing,
a bellows mounted in said housing, one end of said bellows being closed and free, said bellows dividing said housing into two chambers,
the chamber on the exterior of said bellows communicating with and being at the pressure of the inlet to said laminar flow passageway and the chamber on the interior of said bellows communicating with and being at the pressure of the outlet of said laminar flow passageway whereby the extent of the expansion of said bellows is a function of the pressure drop across said laminar flow passageway,
a restrictor mounted on the free end of said bellows and projectable into said orifice a variable amount dependent upon the pressure drop across said laminar flow passageway,
said restrictor being contoured to deeliver increasing amounts of fuel in predetermined relationship to increases of fuel viscosity.

6. The combination of claim 5 wherein the laminar flow passageway is spiralform.

7. A fuel system for a turbojet engine comprising,
a fuel supply,
a first conduit for transmitting fuel from said supply to said engine,
a first metering valve for regulating the fuel flow through said first conduit,
a main fuel control for controlling said first metering valve responsive to predetermined engine requirements,
a second conduit for transmitting fuel from said supply to said engine,
a second metering valve for regulating the fuel flow through said second conduit comprising,
a thin plate orifice and interacting variable restrictor in said second conduit,
means to maintain said pressure drop across said orifice at a predetermined value,
a spiraled passage in series flow relationship with said second conduit,
a differential pressure responsive device connected to generate a signal responsive to the fluid pressure drop across said spiraled passage,
means to vary said restrictor responsive to said signal.

8. For use in a liquid flow system,
a viscosity flow control for regulating liquid flow as a function of viscosity,
said viscosity flow control having an inlet and an outlet and comprising,
means for maintaining a constant pressure drop between said inlet and outlet,
a laminar flow passageway discharging to the outlet of said viscosity flow control,
a thin plate orifice upstream of said laminar flow passageway at the inlet of said viscosity flow control,
a housing into which liquid flows from said orifice,
a bellows mounted in said housing, one end of said bellows being closed and free,
said bellows dividing said housing into two chambers,
the chamber on the exterior of said bellows communicating with and being at the pressure of the inlet to said laminar flow passageway and the chamber on the interior of said bellows communicating with and being at the pressure of the outlet of said laminar flow passageway, whereby the extent of the expansion of said bellows is a function of the pressure drop across said laminar flow passageway,
a restrictor mounted on the free end of said bellows and projectable into said orifice a variable amount dependent upon the expansion of said bellows,
said restrictor being contoured to deliver increasing amounts of liquid in predetermined relationship to increases of liquid viscosity.

9. A viscosity flow control as in claim 8 wherein the laminar flow passageway is formed at least in part by a spiral tube.

10. A viscosity flow control as in claim 8 wherein means are provided for adjusting the bellows toward and away from said orifice to initially position the restrictor with respect thereto.

11. For use in a liquid flow system,
a viscosity flow control for regulating liquid flow as a function of viscosity,
said viscosity flow control having an inlet and an outlet and comprising,
a laminar flow passageway discharging to the outlet of said viscosity flow control, a thin plate orifice upstream of said laminar flow passageway at the inlet of said viscosity flow control,
means for maintaining a constant pressure drop across said orifice,
a housing into which liquid flows from said orifice,
a bellows mounted in said housing, one end of said bellows being closed and free,
said bellows dividing said housing into two chambers,
the chamber on the exterior of said bellows communicating with and being at the pressure of the inlet to said laminar flow passageway and the chamber on the interior of said bellows communicating with and being at the pressure of the outlet of said laminar flow passageway, whereby the extent of the expansion of said bellows is a function of the pressure drop across said laminar flow passageway, and
a restrictor mounted on the free end of said bellows and projectable into said orifice a variable amount dependent upon the expansion of said bellows,
said restrictor being contoured to deliver increasing amounts of liquid in predetermined relationship to increases of liquid viscosity.

12. For use in a liquid flow system,
a viscosity flow control for regulating liquid flow as a function of viscosity,
said viscosity flow control having an inlet and an outlet and comprising,
a housing, into which liquid flows from said inlet,
a thin plate orifice through which the liquid flows from the housing to said outlet,
a bellows mounted in said housing, one end of said bellows being closed and free,
said bellows dividing said housing into two chambers,
the chamber on the exterior of said bellows communicating with and being at the pressure of the liquid entering said casing from said inlet,
a laminar flow passageway extending from the chamber on the exterior of said bellows,
the discharge end of said laminar flow passageway communicating with the chamber interiorly of said bellows whereby the pressure drop across said laminar flow passageway determines the extent of expansion of said bellows,
a second thin plate orifice through which liquid from said laminar flow passageway is discharged,
and means for maintaining a constant pressure drop across said first orifice and also across the inlet to said laminar flow passage to the discharge of said second orifice,
a restrictor mounted on the free end of the bellows and projectable into said first orifice a variable amount dependent upon the expansion of said bellows,
said restrictor being contoured to deliver increasing amounts of liquid in predetermined relationship to increases of liquid viscosity.

13. A viscosity flow control as in claim 12 wherein means are provided for returning the liquid discharged through said second orifice to the outlet of said flow control and the pressure maintaining means comprise a pressure drop regulator maintaining a constant pressure differential between the inlet and the outlet of said flow control.

14. For use in a liquid flow system,
a viscosity flow control for regulating flow control as a function of viscosity,
said viscosity flow control having an inlet and an outlet and comprising,
a housing,
a thin plate orifice through which liquid flows into said housing,
a bellows mounted in said housing, one end of said bellows being closed and free,
said bellows dividing said housing into two chambers,
a laminar flow passageway,
means for directing at least a portion of the liquid flowing through said flow control, through said laminar flow passageway,
one of said chambers being in communication with and at the pressure of the inlet to said laminar flow passageway and the other chamber being in communication with and at the pressure of the discharge from said laminar flow passageway whereby the extent of expansion of said bellows is a function of the pressure drop across said laminar flow passageway, and
means connected to the bellows for varying the effective opening of said orifice whereby the amount of liquid flowing through said viscosity flow control is a direct function of the viscosity of the liquid.

15. A viscosity flow control as in claim 14 wherein the laminar flow passageway is formed, at least in part, by a spiral tube.

16. In a liquid flow system,
means for maintaining a constant pressure drop between two given points,
a laminar flow passageway in said system,
means responsive to the pressure differential between the inlet and outlet of said laminar flow passageway for controlling flow of liquid between the two said points of the passageway as a direct function of the viscosity of said liquid.

References Cited by the Examiner

UNITED STATES PATENTS

| | | | |
|---|---|---|---|
| 2,579,215 | 12/1951 | Te Nuyl | 239—75 X |
| 2,590,111 | 3/1952 | MacCracken et al. | 158—36 |
| 2,781,662 | 2/1957 | Brewer | 73—56 |
| 2,806,519 | 9/1957 | Basford et al. | 158—36 |
| 2,930,432 | 3/1960 | Engstrom | 158—36 |
| 2,971,575 | 2/1961 | Williams | 158—36.4 |
| 3,048,030 | 8/1962 | Dehaven | 73—56 |
| 3,170,503 | 2/1965 | Isley et al. | 158—36 |

FOREIGN PATENTS 772,644  8/1934  France.

FREDERICK L. MATTESON, Jr., *Primary Examiner.*
ROBERT A. DUA, *Examiner.*